United States Patent Office 3,210,206
Patented Oct. 5, 1965

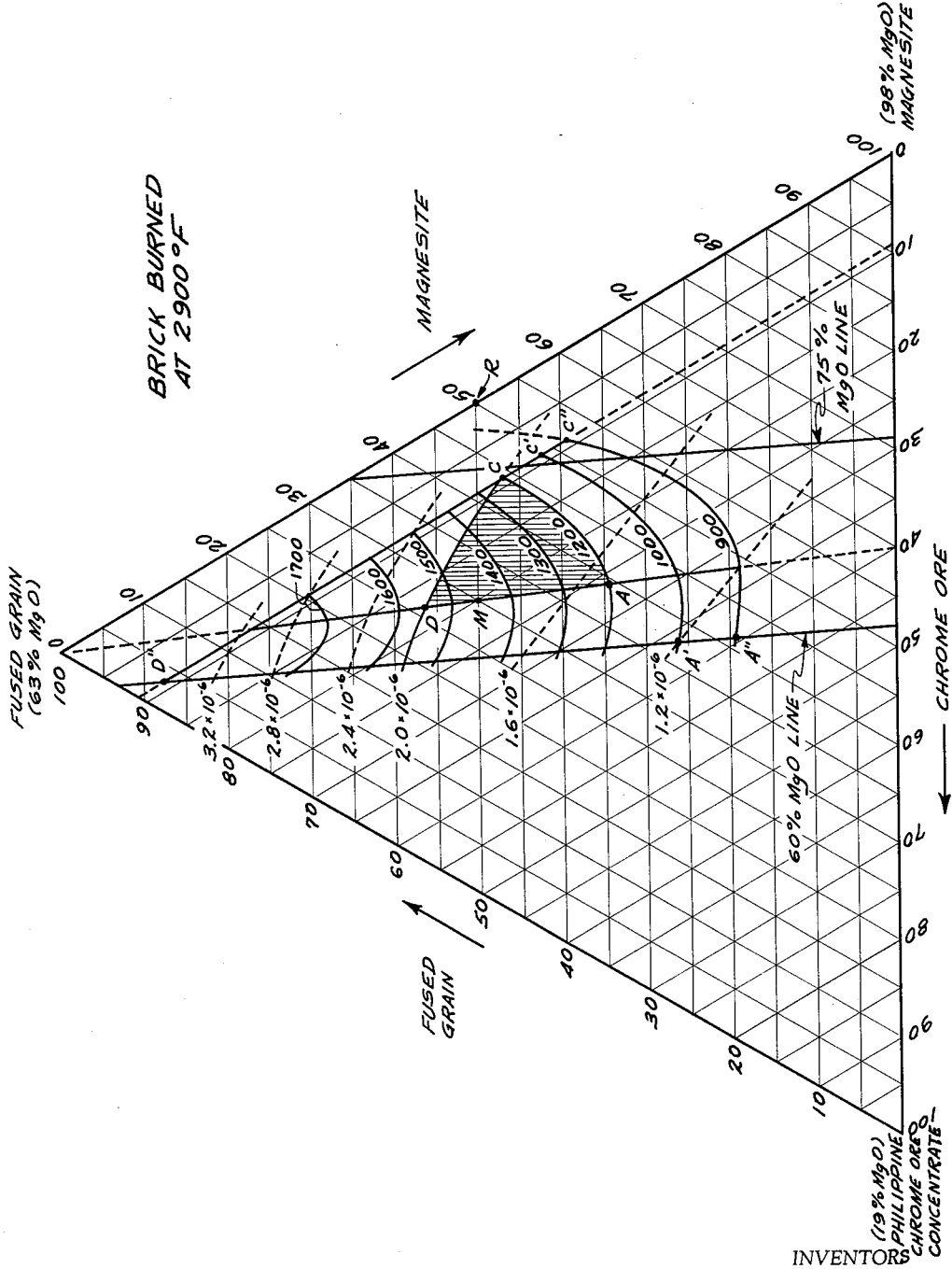

3,210,206
NEW BRICK COMPOSITION
Ben Davies, Pittsburgh, Roger W. Woodruff, Bethel Park, and David C. Hanson, Pittsburgh, Pa., assignors to Harbison-Walker Refractories Company, Pittsburgh Pa., a corporation of Pennsylvania
Filed Jan. 3, 1964, Ser. No. 335,623
14 Claims. (Cl. 106—59)

This invention relates to improved chemically basic refractory shapes and, more particularly, to improved ceramically bonded, chemically basic refractory shapes.

Refractory shapes may be termed chemically bonded or ceramically bonded. The chemically bonded shapes are green or unfired shapes and are put in service in this form. In comparison, ceramically bonded shapes are shapes which have been subjected to elevated burning or firing temperatures, to obtain a sintered ceramic bond through the material which makes up the shape.

It is known by refractories technologists that burned basic brick frequently possess much greater strength than unburned brick, due to the ceramic bond formed through the brick in the burning or firing procedure. However, it is also known that hard firing of the brick, while it may produce superior strength characteristics, produces a brick which is more prone to spall because it lacks the necessary elasticity. Thus, thermal shock resistance is an important consideration in burned basic refractory shapes.

It is also known that uniformity of strength at elevated temperature for all of the brick of a given installation is a thing to be desired. For example, in an open hearth roof, even though most of the brick might have a modulus of rupture at 2300° F. above 1000 p.s.i., if a limited few have a lesser strength, the superior characteristics of the stronger brick may not prevent the roof from failing. One might say that such a composite roof structure is like a chain with a weak link, and the chain is only as strong as that weakest link. It is, therefore, desirable to have predictably uniform strength throughout a burned basic refractory brick installation.

One manner in which the increased strength can be obtained is exceedingly hard firing, i.e., 3050° F. and above. However, there are very few facilities in the United States known to us which are capable of firing at this or higher temperatures on a commercial scale. Still further, even though this high firing may obtain superior strength characteristics, i.e., modulus of ruptures at 2300° F. on the order of about 2000 p.s.i., there is a commensurate drastic reduction in modulus of elasticity.

By way of background, the refractories industry usually classifies its basic refractories according to major constituents. For example, a magnesia or magnesite brick (we use these terms synonymously) is a brick which is predominantly magnesite, i.e., 90% and more. A chrome ore brick, which is also considered a basic brick—even though chrome ore is not chemically basic, probably includes 90% and more of chrome ore. There are also chrome ore-magnesia and magnesia-chrome ore classes of basic refractories. That component, which predominates in the brick, is the first term of descriptive phrase used for the brick. For example, chrome ore-magnesia brick will have between about 50 and 80% chrome ore, and magnesia-chrome ore brick will have between 50 and 80% magnesia. Generally, referring to this latter form of basic refractory, the magnesia is maintained between about 60 and 80%, by weight.

All of the foregoing types or classes of basic refractories are commercially available in both the burned and unburned form. This invention is particularly concerned with a burned magnesia chrome ore-type brick. However, it is classified with this group, not by reason of batch ingredients but, rather, on the basis of the MgO oxide analysis of the brick.

Burned basic brick, as noted above, have superior strength, but are uslally deficient in thermal shock resistance, because of the excessive rigidity imparted to the brick structure by firing; whereas, the other or unburned types, while having good thermal shock resistance (because of their lack of rigidity), are exceedingly weak, as one would probably expect. For example, a chemically bonded, unburned brick has a modulus of rupture at 2300° F., which is practically always less than 500 p.s.i.; whereas, burned ones, particularly of the magnesia-chrome ore type—with which group this invention is particularly concerned, are now commercially available that have a modulus of rupture at 2300° F. in excess of 900 or even 1000 p.s.i.

It is an object of this invention to provide improved, chemically basic, ceramically bonded, refractory brick and shapes of the magnesia-chrome ore class. It is another object of the invention to provide improved, ceramically bonded, chemically basic, refractory brick of the magnesia-chrome ore class, which have both excellent strength at elevated temperatures as well as improved thermal shock resistance, with commensurate ability to withstand cyclic variations in temperature without spalling.

It is yet another object of the invention to provide a novel 3-component refractory batch system usable for the fabrication of improved, ceramically bonded, chemically basic, refractory brick of the magnesia-chrome ore type, which are characterized by a modulus of rupture at 2300° F. consistently above about 900 and preferably 1000 p.s.i.

Briefly, according to a preferred embodiment of this invention, a carefully controlled 3-component system is used to fabricate a brickmaking batch which is, in turn, used for the fabrication of burned, chemically basic, refractory shapes according to this invention. The brick batch preferably consists essentially of a special, chemically basic, fused, refractory grain, which grain is made of Transvaal chrome ore and dead burned magnesia (the magnesia analysis is at least about 96% MgO), which grain is mineralogically characterized by a substantially homogeneous and highly crystalline matrix having spaced deposits of exsolved chrome spinel. These exsolved spinel deposits are substantially all less than 20 microns. A second ingredient is Philippine chrome ore concentrates having low silica content. Other refractory grade chrome ores can be used but the $SiO_2$ content is to be held below about 3%, by weight. The third batch ingredient is dead burned magnesia grain. This latter grain should have an MgO content of at least 90 and, preferably, at least 96%, by weight, and on the basis of an oxide analysis. The fused grain amounts to between about 20 and about 85%, by weight, of the batch. A preferred upper limit is about 60%, by weight. The Philippine chrome ore concentrates amount to between about 10% and as low as 8%, by weight, and as high as 48%, by weight, of the batch. The remainder of the batch is the dead burned magnesia grain but, in all cases, in an amount equal to at least about 10%, by weight, of the total weight of the batch. The total MgO weight content of the entire batch, on an oxide basis by analysis, is between about 60 and about 75%, by weight.

Brick are formed from the foregoing batch as desired, for example, in a conventional manner in which the ingredients are size graded and formed into brick on a brick press at about 8000 p.s.i. On the order of about 4%, by weight, of a concentrated lignin liquor and water tempering fluid (the use of which is well known in the art) is used to temper the refractory ingredients before forming into shapes on the brick press. The resulting shapes are fired at a temperature in the range 2820 to 3050° F. One may fire as high as 3150° F., if they so desire. The preferred firing temperature is 2900° F.

Other objects and further features and advantages of magnesia-chrome ore refractory shapes of this invention will become readily apparent to those skilled in the art by a study of the following detailed description and specific examples, with reference to the triaxial diagram which is the single drawing in this case.

Another interesting aspect of fabrication of refractory shapes according to this invention is that we have been able to obtain high temperature strengths under load with a batch only partially composed of fused refractory grain, which strengths are almost equal to batches fabricated entirely of the fused refractory grain. This was quite unexpected, since fused refractory grain and burned brick made entirely from this grain have long been considered the strongest possible that could be manufactured. However, the expense, at least with contemporary manufacturing techniques, is quite high and seriously delimits the areas in which the all fused grain burned brick are economically feasible.

More recently, certain of the contemporary refractories technologists have determined that a brick having a modulus of rupture of at least about 1000 p.s.i. at 2300° F. is particularly desirable. In some applications, modulus of rupture as low as 900 p.s.i. at 2300° F. are considered acceptable. Refractory brick according to this invention have strengths, according to selection of batch ingredients, between 900 and about 1800 p.s.i. (considering the brick which are burned at the preferred temperature of about 2900° F.).

Considering now modulus of elasticity, which is a measure of the thermal shock resistance of refractory shapes, the terms "coefficient of elasticity" and "Young's modulus" are sometimes used to express the ratio of unit stress to unit deformation, for all values of unit stress not exceeding the proportional limit of given materials.

The thermal shock resistance of brittle ceramic materials is controlled by a number of physical properties. A number of formulae have been suggested to relate these parameters, but the following is most commonly accepted.

$$R = \frac{(1-U)(St)}{K\alpha}$$

R = Thermal stress resistance factor
U = Poisson's ratio
$St$ = Tensile strength
K = Modulus of elasticity
$\alpha$ = Coefficient of expansion The larger the value of R the greater the shock resistance. For a given system the values of $\alpha$ is constant and U is relatively constant, so to improve the shock resistance, the ratio of $St/K$ which is often referred to as the "extensibility" should be maximized.

Referring now to the drawing, which shows the preferred compositional area of batch ingredients according to this invention, brick according to this invention fall within the area enclosed by the lines intersecting points A″, C″ and D″.

The drawing utilizes the principles which characterize all such three component triaxial diagrams. This one encompasses all possible combinations of the three batch components—fused grain, magnesite and Philippine chrome ore concentrates. The apex labeled fused grain represents 100% of this component, the lower left-hand corner 100% of Philippine chrome ore concentrates and the right corner 100% of magnesite grain. In any such ternary diagram, the three sides represent three binary systems which, in this instance, are fused grain-magnesite (at the right), magnesite-Philippine chrome ore concentrates (at the bottom), and Philippine chrome ore concentrates-fused grain (at the left). It is a characteristic of the geometry of such diagrams that a line drawn from any point on the base to the opposite corner will mark the loci of every composition in the entire ternary system having the same ratio of the two base components. Similarly, what we have labeled the "60 MgO line" and the "75% MgO line" mark the loci of every combination in the entire ternary system having respective 60 and 75% MgO contents.

The line A″–C″ is plotted along one of the isomods (a line drawn through compositions which yield brick having identical modulus of rupture) which is indicative of specimens having a modulus of rupture at 2300° F. of 900 p.s.i. Those specimens having batch compositions falling along the line A′–C′ have a modulus of rupture at 2300° F. of 1000 p.s.i. The other lines of concave configuration are numbered 1200 through 1700 and they are also indicative of the modulus of rupture so stated. A shape fabricated of a batch at the acme of the triangle shown in the drawings, i.e., the point D″, has a modulus of rupture at 2300° F. on the order of 1900 p.s.i.

As we have noted previously, the total MgO content of brick according to this invention should fall between 60 and 75%, on an oxide basis. The line A″–D″ is on the 60% MgO line calculating the total MgO content of all ingredients. As one proceeds to the left thereof, the Philippine chrome ore concentrates becomes an increasingly larger proportion of the batch, thereby lowering the MgO content. We have found that if one proceeds too far towards these lesser MgO contents, the brick do not have sufficient resistance to calcium silicate-containing ferrous slags of the type magnesia-chrome ore brick conventionally contact or with which they are conventionally used. As one proceeds to the right, past the line D″–C″, and the MgO content increases above about 75% MgO (76 MgO being approximately the actual plot of the point C), modulus of elasticity and strength at elevated temperatures drop off at an alarming rate. For example, considering a brick of a mix of about 50% of the magnesia (this is point R), all other things being equal in testing and fabrication, the strength of resulting shapes was found to be on the order of 560 p.s.i., as compared to 1200 p.s.i. at point C. The ratio $St/K$ derived in the manner above noted for a composition falling at point R, was found to be less than one-half that at point C.

The optimum and preferred area of batch constituents is defined within the lines A–C, C–D and D–A. We consider the optimum and preferred composition to be at the point M. While its strength (at point M) is not as high as those approaching the apex D″, it has on the order of about 1450 p.s.i. modulus at 2300° F., which is considered excellent. The line D–C is drawn to pass through brick compositions having the identical modulus of elasticity, $2 \times 10^{-6}$. The other convex and straight lines which slope downwardly from left to right are plots of the numerically indicated modulus of elasticity.

Preferred batch ingredients, according to the concepts of this invention, have the following oxide analysis, on a weight basis. The dead burned magnesia or magnesite, which is used as a batch ingredient and which is also used as an ingredient of the fused grain, consists of about 97.5% MgO, by weight, on an oxide basis, 0.9% CaO, 0.7% $SiO_2$, the remaining 0.7% of the composition being the sesquioxides $Al_2O_3$ and $Fe_2O_3$ plus loss on ignition. The Philippine chrome ore concentrates have approximately the following chemical analysis: $Al_2O_3$ about 33.4%, FeO about 11.2%, $Cr_2O_3$ about 33%, CaO about 0.3%, MgO about 19%, and the $SiO_2$ about 2.4%. When we speak of Philippine chrome ore concentrates, we refer to beneficiated Philippine chrome ore. In essence, the beneficiation lowers the silica content from about 5.5%, which one would normally expect, to 3% or less. The constituents, of an oxide-basis—just set forth, are considered typical of the beneficiated ore; but, in many instances, the $SiO_2$ is even lower, i.e., 2% perhaps, with commensurate variation in the other ingredients.

The fused grain we prefer to use is manufactured from

Transvaal chrome ore and, preferably, the same high purity magnesia, the analysis of which is set forth immediately above. Transvaal chrome ore has approximately the following chemical analysis: $SiO_2$ about 3%, $Al_2O_3$ about 15.7%, FeO about 24.1%, $Cr_2O_3$ about 43.9%, CaO about 0.3%, MgO about 11.0%, the remainder loss on ignition. The particular grain, which we use, which is made from a mixture of the Transvaal chrome ore and high purity magnesite, has an overall chemical analysis approximately as follows: MgO about 63%, $Cr_2O_3$ about 20%, $Fe_2O_3$ about 12%, $SiO_2$ about 1%, the remainder being mostly the sesquioxides $Al_2O_3$ and CaO, predominantly $Al_2O_3$.

Our preferred specifications for this fused grain are approximately as follows:

| | |
|---|---|
| MgO _____ percent__ | 60 to 65 |
| $R_2O_3$ ($Cr_2O_3$, $Al_2O_3$, $Fe_2O_3$) _____ do____ | 32 to 38 |
| Of the accessory oxides _____ do____ | 1 to 3 |
| $Fe_2O_3$, less than _____ do____ | 12 |
| $SiO_2$, less than _____ do____ | 2 |
| CaO, less than _____ do____ | 1 |
| BSG, greater than _____ | 3.50 |
| Porosity, less than _____ percent__ | 10 |

It should be noted that each of the three batch ingredients, i.e., the fused grain, the dead burned magnesite or magnesia grain. (We use the terms magnesite and magnesia synonymously), and the Philippine chrome ore concentrates, all contain some magnesia or at least material which analyzes MgO on an oxide basis. The ternary diagram, which serves as the drawing for this case, has been discussed above; and the line A″–B″ was stated to be about the 60% MgO line, considering the total batch. It should, of course, be understood that the MgO oxide analysis of the total batch is obtained by multiplying the percentage of the various ingredients in the batch, times their respective MgO content. For example, considering point C in the drawing, there is 8% of Philippine chrome ore concentrates having about 19% MgO on an oxide basis, which MgO constitutes about 1.5% of the total batch. The dead burned magnesia grain constitutes about 45% of the batch, and it has about 97.5 to 98% MgO, thereby contributing about 44%, by weight, MgO to the total batch. The fused grain constitutes about 47% of the batch, and it contains about 63% MgO (it can range from 60 to 65% MgO as noted elsewhere), thereby contributing slightly less than 30% MgO to the total batch. Combining the MgO contents of the various ingredients, one arrives at the figure of about 75% MgO in the total batch. Like calculations can be made for each mix within the area A″, C″ and D″ (and any other point on the diagram for that matter).

Of course, the ingredients must be size graded to form a brickmaking batch so brick can be made. Preferred sizing of the total batch is approximately 20% about −4+10 mesh, about 30% −10+28 mesh, about 10% −28+65 mesh, with the remaining about 40% passing a 65 mesh screen. We prefer that on the order of 30–35% of the −65 mesh material also pass a 150 mesh screen.

A preferred batch and method of manufacture of brick therefrom is as follows: A batch is prepared of about 50% −3+28 mesh fused grain, about 30% −65 mesh dead burned magnesite grain, and about 20% −28 mesh Philippine chrome ore concentrates. The batch is tempered with about 4%, by weight, based on the total weight of the solids of a 3:1 lignin liquor and water mixture, and fired at a temperature of 2900° F. The modulus of elasticity of the resulting shape is less than $2 \times 10^{-6}$, and its modulus of rupture at 2300° F. is about 1450 p.s.i.

In a subsequent test, the same batch ingredients were prepared, as just mentioned, and fired at 3000° F. The modulus of rupture at 2300° F. was about 1900 p.s.i. The sonic modulus of elasticity was about $2.5 \times 10^{-6}$. By way of comparison, in an identical manufacturing procedure, a brick was fabricated entirely of the fused grain. Its modulus of rupture at 2300° F. was 2100 p.s.i. (only slightly more than our preferred composition), and its modulus of elasticity was about $3.5 \times 10^{-6}$. Thus, using all fused grain, nominal increase in modulus of rupture at 2300° F. is obtained, but the modulus of elasticity increases on the order of 30–40%, thereby reducing the thermal shock resistance; and, even further, the cost of such an all-fused grain shape is on the order of twice as much as a brick of the preferred composition.

Our testing has convinced us that a batch mixture which contains from 50–80% of the fused grain (ground so it all just passes a 4 mesh screen thereby to provide about a 30, 35, 35%, −4+10, −10+28, −65 mesh sizing), with the balance Philippine chrome ore concentrates and high purity dead burned magnesite grain, will serve to make ceramically bonded brick having physical properties substantially equivalent to brick made entirely from the fused grain, at considerably less cost. Generally speaking, the magnesite is substantially all ball mill fines, or −65 mesh, with a major portion (about 40 or 50 to 60%) of it passing a 150 mesh screen, and with none of the magnesite greater than 10 mesh. The Philippine chrome ore concentrates are actually so size graded as to fill out the preferred overall sizing which was mentioned above, to thereby give good packing density. Actually, it is practically all just −6 mesh with sufficient −28 mesh constituents to constitute about 16% of the −28 mesh fraction of the overall batch. We find the most economic brick, which will still provide satisfactory strengths (above 1000 p.s.i. modulus of rupture at 2300° F.), are brick which are burned between 2800 and 2900° F. for about 10 hours. Such temperatures are easily obtained in practically any contemporary tunnel kiln used to burn basic refractory brick. Even greater strengths can be obtained by burning the brick to 3000° F., but this really does not seem necessary for most applications.

The ceramically bonded brick, which result, are characterized by extensive direct bonding between chemically similar constituents in the fused grain, and the chrome spinel and periclase constituents of the other batch ingredients. By direct bonding, we mean crystal to crystal attachment with very little silicate filming. To obtain best direct bonding, the total $SiO_2$ content, on an oxide analysis, of the total batch, should be maintained well below about 5%, with increasingly superior results as this material is lessened. Actually, though, it does not appear economically practicable to attempt to formulate a batch with less than about 1% $SiO_2$.

Having thus described the invention in detail and with sufficient particularity as to enable those skilled in the art to practice, what is desired to have protected by letters patent is set forth in the following claims:

We claim:

1. A brick batch consisting essentially of basic, fused refractory grain, refractory grade chrome ore containing no more than about 3% $SiO_2$, and high purity dead burned magnesia grain, said fused grain fabricated of a batch mixture consisting essentially of Transavaal chrome ore and high purity magnesite and being mineralogically characterized by a substantially homogeneous crystalline matrix having spaced deposits of exsolved chrome spinel, said fused grain constituting from about 20 to about 80%, by weight, of the batch, and analyzing between 60 and 65% MgO on an oxide basis, the chrome ore constituting from about 10 to about 48%, by weight, of the batch, the remainder of the batch being dead burned magnesite grain but in an amount no lower than about 10%, by weight, of the total batch, the total MgO weight content of the entire batch, on an oxide analysis, being between about 60 and 75%.

2. The batch of claim 1 in which the fused grain constitutes between about 50 and about 80%, by weight, of the batch.

3. The batch of claim 1 in which the magnesia used to fabricate the fused grain and the dead burned magnesia grain batch constituent both have at least about a 96% MgO content, by weight, on the basis of an oxide analysis.

4. A refractory batch composition consisting of high purity and dead burned magnesite, Philippine chrome ore concentrates, and fused grain made from a mixture of Transvaal chrome ore and high purity magnesite, which fused grain has an MgO content on the order of about 60% to 65%, which batch falls within the area defined by lines connecting points A″, D″, C″ of the triaxial diagram forming the attached drawing.

5. A refractory batch composition consisting of high purity dead burned magnesia, Philippine chrome ore concentrates, and fused grain made from a mixture of Transvaal chrome ore and high purity magnesite, which fused grain has an MgO content on the order of about 60 to 65%, which batch falls within the lines A′–D″, D″–C′, and C′–A′ of the triaxial diagram forming the attached drawing.

6. The batch of claim 5 in which the batch falls within the lines A–D, D–C, and C–A.

7. A ceramically bonded, chemically basic refractory brick of the magnesia-chrome ore type, said brick made from a batch consisting essentially of basic, fused refractory grain, Philippine chrome ore concentrates, and high purity dead burned magnesia grain, said fused grain fabricated of a batch mixture consisting essentially of Transvaal chrome ore and high purity magnesite and being mineralogically characterized by a substantially homogeneous crystalline matrix having spaced deposits of exsolved chrome spinel, and analyzing between 60 and 65% MgO on an oxide basis, said fused grain constituting from about 20 to about 80%, by weight, of the batch, the Philippine chrome ore concentrates constituting from about 10 to about 48%, by weight, of the batch, the remainder of the batch being dead burned magnesite grain but in an amount no lower than about 10%, by weight, of the total batch, the total MgO weight content of the brick, on an oxide analysis, being between about 60 and 75%, said brick fired at a temperature in the range 2820–3150° F. and characterized by direct bonding of mineralogically similar portions of the batch ingredients.

8. The brick of claim 7 in which the fused grain constitutes between about 25 and about 80%, of its total weight.

9. The brick of claim 7 in which the magnesia used to fabricate the fused grain and the dead burned magnesia grain both have at least about a 96% MgO content, by weight, on the basis of an oxide analysis.

10. A burned, chemically basic brick made from a batch of material consisting of high purity dead burned magnesite, Philippine chrome ore concentrates, and fused grain made from a mixture of Transvaal chrome ore and high purtiy magnesite, which fused grain has an MgO content on the order of about 60 to 65%, which batch falls within the area defined by lines connecting points A″, D″, C″ of the triaxial diagram forming the attached drawing.

11. A burned, chemically basic, refractory brick made from a batch of material consisting of high purity dead burned magnesite, Philippine chrome ore concentrates, and fused grain made from a mixture of Transvaal chrome ore and high purity magnesite, which fused grain has an MgO content on the order of about 60 to 65%, which batch falls within the lines A′–D″, D″–C′, and C′–A′ of the triaxial diagram forming the attached drawings, said brick burned at a temperature in the range 2820 to 3150° F.

12. The brick of claim 11, said brick burned at a temperature of about 2900° F.

13. A ceramically bonded, chemically basic refractory brick, said brick made from a batch consisting essentially of basic, fused refractory grain, refractory grain chrome ore containing no more than about 3% $SiO_2$, and high purity dead burned magnesia grain, said fused grain fabricated of a batch mixture consisting essentially of Transvaal chrome ore and a high purity magnesite and being mineralogically characterized by a substantially homogeneous crystalline matrix having spaced deposits of exsolved chrome spinel, said fused grain constituting from about 20 to about 80%, by weight, of the batch, and analyzing between 60 and 65% MgO on an oxide basis, the chrome ore constituting from about 10 to about 48%, by weight, of the batch, the remainder of the batch being dead burned magnesite grain but in an amount no lower than about 10%, by weight, of the total batch, the total MgO weight content of the entire batch, on an oxide analysis, being between about 60 and 75%.

14. A ceramically bonded, chemically basic refractory brick, said brick containing (1) 20 to 82%, by weight, of a fused grain consisting essentially of Transvaal chrome ore and high purity magnesite and having an MgO content, on an oxide basis, between 60 and 65%, (2) from about 8 to about 48%, by weight of refractory grade chrome ore, (3) the remainder of the batch being dead burned magnesite grain in an amount constituting at least about 10%, by weight, of the total brick, the total MgO content of the brick, on an oxide basis, being between about 60 and 75% and there being no more than about 5%, by weight, of $SiO_2$, on the basis of an oxide analysis, in the brick, and said brick characterized by direct bonding of mineralogically similar phases of the ingredients (1) fused grain, (2) dead burned magnesite, and (3) refractory grade chrome ore.

References Cited by the Examiner

UNITED STATES PATENTS

| 3,036,925 | 5/62 | Heuer | 106—59 |
| 3,116,156 | 12/63 | Charvat | 106—59 |
| 3,180,743 | 4/65 | Davies et al. | 106—66 |
| 3,180,745 | 4/65 | Davies | 106—59 |

SAMUEL H. BLECH, *Primary Examiner.*

TOBIAS E. LEVOW, *Examiner.*